United States Patent [19]

Koyamatsu et al.

[11] Patent Number: 5,522,561
[45] Date of Patent: Jun. 4, 1996

[54] FIBER OPTIC CABLE PAYOUT SYSTEM

[75] Inventors: Anthony H. Koyamatsu, Kaneohe, Hi.; Herbert L. Mummery, deceased, late of Kaneohe, Hi., by Lois A. Mummery, executrix; Warren L. Hahn, Waipahu, Hi.

[73] Assignee: The United States of America as represented by the Secretary of the Navy, Washington, D.C.

[21] Appl. No.: 892,861

[22] Filed: Jun. 3, 1992

[51] Int. Cl.⁶ .......................... B65H 49/00; B65H 55/04; B65D 85/67
[52] U.S. Cl. .......................... 242/178; 242/129; 242/170; 206/409; 206/410
[58] Field of Search .................. 242/170, 171, 242/173, 178, 167, 159, 18 G, 25 R, 128, 129; 206/409, 410, 400, 53, 55

[56] References Cited

U.S. PATENT DOCUMENTS

| | | |
|---|---|---|
| 2,596,970 | 4/1950 | Adams. |
| 2,727,703 | 12/1955 | Bonnett .................... 242/159 |
| 3,114,456 | 12/1963 | Billiard .................... 242/159 |
| 3,272,455 | 9/1966 | Sternberg et al. ............ 242/171 |
| 3,545,192 | 12/1970 | Hickman. |
| 3,593,943 | 7/1971 | Collmann .................... 242/129 |
| 3,785,137 | 1/1974 | Karlson. |
| 3,815,845 | 6/1974 | Rygiol ...................... 242/129 |
| 4,067,441 | 1/1978 | Newman et al. ............. 242/170 X |
| 4,300,734 | 11/1981 | Green et al.. |
| 4,398,677 | 8/1983 | Henrich ..................... 242/25 R |
| 4,467,916 | 8/1984 | Hedden et al.. |
| 4,580,399 | 4/1986 | Henrich. |
| 4,673,140 | 6/1987 | Boles ........................ 242/170 |
| 4,763,785 | 8/1988 | Bradley et al.. |
| 4,786,213 | 11/1988 | Leppanen ................... 242/129 X |

FOREIGN PATENT DOCUMENTS

| | | | |
|---|---|---|---|
| 1018914 | 2/1966 | United Kingdom | .................. 242/170 |

Primary Examiner—Daniel P. Stodola
Assistant Examiner—Michael R. Mansen
Attorney, Agent, or Firm—Harvey Fendelman; Thomas Glenn Keough; Peter A. Lipovsky

[57] ABSTRACT

An inside fiber optic payout system uses winding and packaging techniques with an inner stabilizing tube to ensure reliable cable payout. Stiff, elastic cable is rapidly non-precision wound onto a collapsible core spool at a preferred winding pitch. Stand-off attachments are installed over the outer cable layer between opposed spool flanges to support the cable pack when the collapsible core is removed. Duct tape is wrapped around the stand-offs and the outer cable layers to assist in keeping the cable pack stable (without collapsing) even up to its last few layers. The stand-offs also prevent the tape from being drawn out as the final layers of cable are dispensed. A shroud is installed over the tape and stand-offs. Payout preparation includes removing the spool's collapsible core leaving a central aperture in at least one flange of the spool. A circular payout guide is placed over this aperture and a rubber diaphragm is attached to the guide to provide friction for payout back tension. A stabilizing tube is attached to project through the spool's center between the inner diameter of the wound cable. An inner end of the cable is passed through a tubular shaped void existing between the stabilizing tube and the inner periphery of the cable and is passed through the payout guide to be dispensed. The cable spool is easily configured for cable recovery by removing the stand-offs and reinstalling the collapsible core.

13 Claims, 1 Drawing Sheet

FIBER OPTIC CABLE PAYOUT SYSTEM

STATEMENT OF GOVERNMENT INTEREST

The invention described herein may be manufactured and used by or for the Government of the United States of America for governmental purposes without the patent of any royalties thereon or therefor,

BACKGROUND OF THE INVENTION

1. Field of the Invention

This invention pertains broadly to cable storage and dispensing (payout) systems. In greater particularity, the invention relates to a fiber pack that can be rapidly and easily assembled and that can be rapidly paid out with minimal fiber trauma.

2. Description of the Related Art

Deployment, otherwise known as payout, of long length cables (5 kilometers or more) can be performed in a variety of ways. One of the simplest ways is to wind the cable around a cylindrical spool, place a rod through the center of the spool and then pull the cable from the outside of the spool as the spool is rotated around the rod, For long lengths of cable, the large inertial forces of the cable pack will require a substantial power source to rotate the cable spool during cable deployment. Because of these inertial forces, quick starts and stops of the deployment process are difficult. Another disadvantage inherent in this method is that access is not allowed to both ends of the cable during payout. If the inside (radially inward) end of the wound cable were fixed in relation to spool rotation, the rotations of the spool during payout will result in axial twists of the cable. An accumulation of these twists will eventually result in cable damage. In many cases it is desirous that the inside end of a cable pack be fixed to permit the transmission of electrical or optical signals during deployment. Optical slip rings have been devised to accomplish this but these are extremely expensive.

Another outside cable payout method is a passive payout technique. In this method cable is pulled from a stationary spool in a direction that is coaxial with the spool's axis. Sewing machine bobbins use this common payout scheme. This method, like the first discussed, introduces an axial twist into the cable each time a wrap of cable is unwound from the cable spool. As previously stated, an accumulation of these twists can cause damage to the cable, particularly if the cable is reused.

For both rotating (active) and stationary (passive) spool techniques, the axial twists that occur to the cable during deployment can be nullified by introducing one counter-rotated twist in the cable for each wind of cable around its spool.

Several limitations and disadvantages are present with these outside payout techniques. For rapid payout, fiber height is generally limited to approximately 4.5 inches from the spool's core to the spool's flange. It was found that during payout, dispensed cable will not climb any higher distances in a reliable fashion. Thus, to increase the capacity of these spool arrangements, either the axial length of the spool or both of the core and flange diameters would need to be increased, while maintaining the maximum core-to-flange height. Such spools would be undesirably large in size.

Further increasing the size of these outside cable payout designs is their payout shrouds. A shroud or hood reduces the cable helix formed during high speed payout, keeping the dispensed cable in line with the spool's axis. The shroud also prevents the cable's helix from snagging on external hardware.

Another characteristic inherent with the passive outside payout techniques is the substantial payout tension required to dispense the cable. This tension typically runs anywhere from one to five pounds.

A third method of dispensing cable is with an active outside payout mechanism. In this method a mechanized arm is used to unwind cable from the utilized spool. One such active cable handling method uses a mechanism to maintain a constant cable payout tension. In this method the mechanized arm rotates around the cable spool and actively unwinds cable from the spool when cable payout tension is high and winds cable back onto the spool when cable payout tension is low. This wind/unwind action produces an automatic payout and pickup device for cable handling. Disadvantages of this system include mechanical complexity (increasing chance for failure); the requirement for an active drive mechanism to dispense cable; fixed cable length; and difficult cable replacement.

Inside payout is a cable payout dispensing method similar to the passive outside payout method. Cable is dispensed axially from a cable pack, starting from the inside of the cable pack and working outwardly. As with the outside payout method, cable preparation requires that a single axial twist be applied for every turn of the cable onto the utilized spool. Previous experience has dictated that the cable must be precision wound to improve packing efficiency and that an adhesive be applied to each layer of cable to keep the cable pack from falling inward into the hollow center of the pack. This combination of precision winding and adhesives has been thought to be necessary to maintain cable pack stability; however, preparing the cable pack in this fashion has proven to be a very tedious process, taking up to one hour to wind a single kilometer of cable.

After the cable is wound using the above described technique, it is placed in a container and is foamed in place. The hardened foamed packaging provides further support to keep the cable pack intact after the spool's inner core is removed. Removal of this foam is not a simple task and if not properly done, the foam can break into a multitude of minute non-biodegradable pieces that pose a possible pollution hazard.

The advantages of an inside payout cable pack include the ability to store long cable lengths in a compact profile and to dispense cable at small payout tensions (less than one pound). However, disadvantages of this scheme include the excessive time required to prepare cable packs for payout, the complexity of equipment to precision wind and foam the cable packs, and the accumulation of adhesives on the cable's outer jacket.

There is thus the need to provide a compact, reliable, easily prepared and reusable method for dispensing long lengths of cable.

SUMMARY OF THE INVENTION

The invention substantially accomplishes the above-described needs through a novel inside fiber optic cable payout system. The invention utilizes a specific combination of winding and packaging techniques together with a stabilizing tube to ensure reliable inside cable payout. By utilizing the process of the invention the need for an adhesive and the slow process of precision winding is eliminated.

The cable is initially level wound (non-precision) onto a two-flanged, collapsible core spool. This winding may be accomplished at pitches of 0.5 inches to 1.0 inches and at winding tensions of approximately three pounds, permitting the cable to be wound at relatively rapid speeds with little supervision. One axial twist per turn of cable is introduced for each wind of cable around the utilized spool to insure that payout will result in zero net axial twist to the cable.

A stiff, elastic cable is used in conjunction with the cable pretwist and the preferred winding pitch. This combination eliminates the need for adhesives and successfully prevents cable coils from dislodging during dispensing. As previously mentioned, typical inside payout techniques suffer from "dropped" or "collapsed" coils, precipitating cable snagging, tangling and ultimately cable failure. By using the invention these prior art shortcomings are largely avoided.

After cable is wound onto the collapsible spool, stand-offs or attachments are installed over the outer layer of the cable pack between the opposed spool flanges. The stand-offs provide support to hold the cable pack intact once the collapsible inner core is removed.

The stand-offs are snugly pressed over the outer periphery of the cable and then duct tape is wrapped around the stand-offs and the outer layer of the cable. The tape sticks to the last few layers of cable to hold these to the stand-offs after the majority of inner layers have been paid out. This permits the cable pack to remain stable (without collapsing) even up to its last few layers. The stand-offs also prevent the tape from being drawn from the pack spool as the final layers of cable are dispensed. For additional support and cable protection, an optional shroud may be installed over the tape and the stand-offs.

Payout preparations include first removing the spool's collapsible core. Removal of the core is designed to leave a central aperture in at least one flange of the spool. A circular payout guide of predetermined diameter is placed over the outer edge of this aperture and then a rubber diaphragm is attached to the guide. As will be discussed, the cable is fed through this payout guide. The diaphragm provides the friction necessary for payout back tension that will prevent ballooning of the cable as it exits the cable pack.

A stabilizing tube is inserted in the center of the spool between an inner diameter periphery of the wound cable. In the embodiment of the invention to be described, the stabilizing tube is fastened to a first flange of the pack spool that lies opposite to the flange to which the payout guide is attached. A tubular shaped void will exist between the payout stabilizing tube and the inner diameter periphery of the cable pack. An inner end of the cable is led through this void and through the payout guide so the cable can be dispensed.

After payout, the cable spool is easily configured for cable recovery. Basically, this requires the removal of the stand-offs and stabilizing tube and re-installation of the spool's collapsible core.

OBJECTS OF THE INVENTION

It is an object of this invention to provide a compact, reliable, easily performed, and reusable method of dispensing long lengths of cable including fiber optic cable.

Another object of this invention is to provide a cable payout method that does not require moving parts to dispense cable.

Still another object of this invention is to provide an inner payout cable pack that may be wound without the use of adhesives.

Yet another object of this invention is to provide an inner payout cable pack that may be wound without the need for precision winding.

Still a further object of this invention is to provide tangle-free dispensing of cable from an inner payout cable pack.

Other objects, advantages and new features of the invention will become apparent from the following detailed description of the invention when considered in conjunction with the accompanied drawings.

DESCRIPTION OF THE PREFERRED EMBODIMENT

The fiber optic cable payout system of the invention provides a compact, reliable, easily performed and reusable method of dispensing long lengths of cable. In general this is accomplished through a combination of winding and packaging techniques together with an interior stabilizing tube that ensures reliable inside payout. The stabilizing tube prevents cable payout from tangling and forming multiple loops during deployment.

Cable pack preparation begins with cable being rapidly wound on a spool and ends with the spool being transformed into a payout pack. After payout, the spool is reconfigured to retrieve the payed out cable. The following description will focus on the cable winding, pack preparation, and payout preparation techniques used in this cable payout system.

Figure 1:
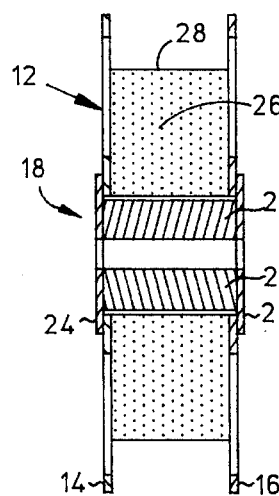
FIG. 1 is a cross-sectional view of a portion of the fiber optic cable payout system of the invention shown with cable and collapsible core installed.
Figure 3:
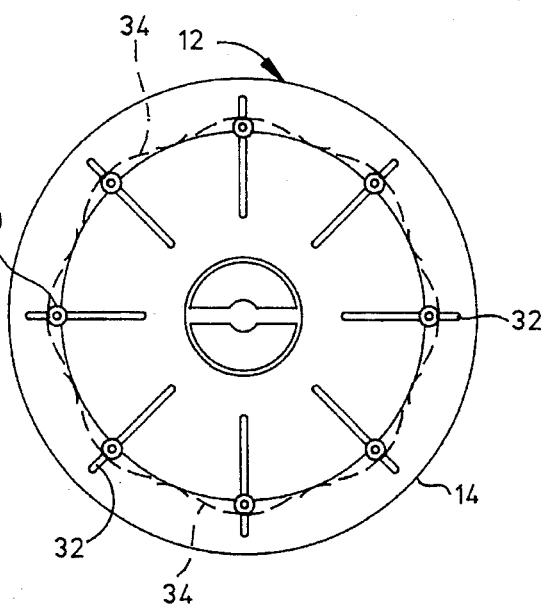
In FIG. 3 a front view of a cable payout spool is shown in which the adhesive tape utilized in the invention can be seen.

Referring to FIGS. 1 and 3 there is shown a removable core, two-flanged spool 12. As can be seen spool 12 includes a first flange 14 and a second flange 16, shown in these figures as being joined by removable core 18. This removable core may include two halves 20 and 22 that are adjoined by disks 24 mounted to the halves and the flanges by fasteners not shown.

The cable winding process begins with the cable being level wound (non-precision) onto spool 12 as the spool is rotated. In a preferred embodiment of the invention this winding was conducted at winding pitches of 0.5 inches to 1.0 inches and at winding tensions of approximately three pounds. These winding conditions permitted the cable to be wound at relatively rapid speeds (typically 10 kilometers per hour) with little supervision. During the course of winding the cable is pretwisted in a conventional way such that one axial twist of the cable is introduced for each wind of the cable around the spool. This twisting is done so that during payout an axial untwisting of the cable will take place, resulting in zero net axial twists to the cable. In a preferred embodiment of the invention, a relatively stiff cable is used to aid in preventing cable entanglement. Such cable is available through the American Telephone and Telegraph Company under the trademark "ACCUTETHER 220".

With typical inside payout techniques "dropped" or "collapsed" interior coils are major causes of cable snagging, tangling and ultimate cable failure. Adhesives applied between cable layers and the use of precision winding has been used in the past to prevent these undesirable cable conditions; however, as mentioned previously, these are time consuming and cumbersome techniques. The first steps the invention takes toward eliminating cable failure is the use of a stiff, elastic cable, a pretwist in each cable wind and a preferred winding pitch of 0.5 inches to 1.0 inches. Through these steps, the need for an adhesive and the slow process of precision winding is avoided.

Figure 2:
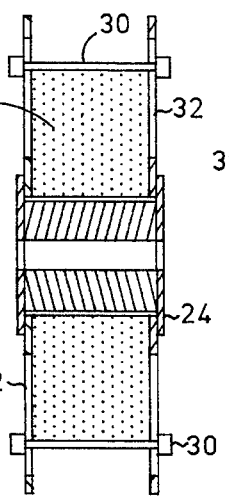
FIG. 2 is like FIG. 1 in which some of the stand-offs utilized in the invention are shown.

Referring now to FIGS. 1–3, after cable coil 26 is wound onto spool 12, eight stand-offs are installed to press against an outer diameter periphery 28 of cable 26. Stand-offs 30 can be seen in FIGS. 2 and 3. The stand-offs can be conventional bolts and fasteners and are fixed within slots 32 located in the flanges of spool 12. The slots allow the stand-offs to be adjustable (in the radial direction of the spool) since different lengths of cable will produce different outer pack diameters. The stand-offs provide support to retain cable 26 in a pack formation once core 18 is removed.

Once the stand-offs 30 are snugly pressed over the outer diameter periphery of the wound cable 26 they are tightly secured within slots 32. Conventional duct tape 34 (two inches to three inches wide) is then wrapped over the stand-offs and outer circumference of cable 26. The wraps of cable 26 between the stand-offs protrude enough for the tape to stick to the last few cable layers so as to hold these layers in place, adjacent the stand-offs after the inner layers have paid out. Without this tape, the coil of cable 26 remains stable (without collapsing) only up until its last few layers. After that, some of the coils may tend to drop (collapse) because of spool vibration or from the dispensed cable "whipping" inside the pack during payout. In addition to holding the cable pack, the stand-offs provide the support necessary to hold the tape in place as the last few layers of cable are payed out. Without the stand-offs, the tape would remain adhered to the cable as it is dispensed.

Figure 4:
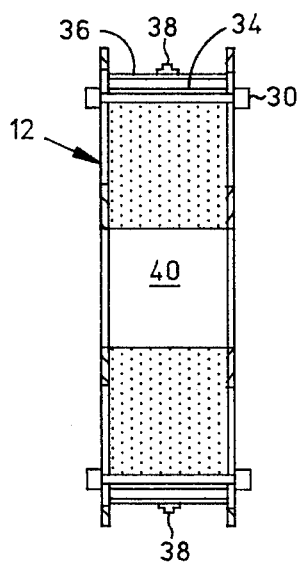
FIG. 4 depicts the fiber optic cable payout system of the invention in which the collapsible core has been removed and a protective shroud has been attached.

In FIG. 4 tape 34 can be seen. Also shown in FIG. 4 is an optional shroud 36 that may be installed over tape 34 and stand-offs 30 to provide additional protection to cable 26. This shroud is preferably fabricated of sheet metal in two halves. The halves overlap the entire circumference of the cable pack and may be secured in place by a conventional mechanism such as a hose clamp 38. An additional advantage of the shroud/clamp configuration is the added support provided to the cable pack by keeping it tightly bound. In the case where one of the stand-offs becomes loose, such as in a vibration environment, the wrapped cable will still be held up by the clamp and the remaining tightly secured stand-offs.

With the shroud in place and the collapsible core intact, the cable pack is in an ideal state for transportation or storage. The collapsible core keeps the inner layers of the cable pack in place. With the outer shroud wrapped tightly around the outer periphery of cable 26, the outer layers of the cable pack will be well protected.

As shown in FIG. 4 the first step in preparing for payout is the removal of collapsible core sections 18 (shown in FIGS. 1–3) from spool 12. The disks 24 are first removed then the core halves 20 and 22 are collapsed and removed. Removal of the core leaves a void 40 in the center of spool 12. It is within this void that a payout stabilizing tube is inserted.

Figure 8:
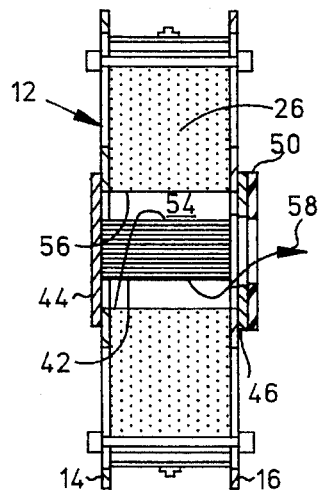
In FIG. 8 there is shown an assembled inner payout spool according to the invention with the stabilizing tube and payout guide/diaphragm in place.
Figure 5:
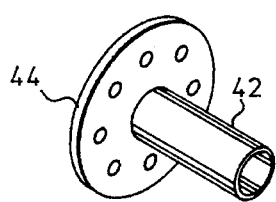
FIG. 5 illustrates a payout stabilizing tube and frame structure as may be utilized in the invention.
Figure 6:
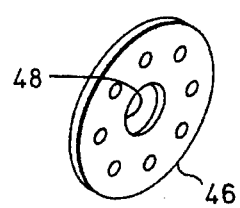
In FIG. 6 a payout guide as may be used in the invention is shown.
Figure 7:
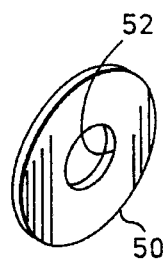
In FIG. 7 there is shown a rubber diaphragm for use in conjunction with the payout guide of FIG. 6.

Referring now to FIGS. 5–8, it can be seen that in FIG. 5 payout stabilizing tube 42 is shown pre-attached to a mounting flange 44. In FIG. 8 it can be seen that stabilizing tube 42 is inserted between spool flanges 14 and 16. Flange 44, attached to stabilizer tube 42, is fastened to flange 14 of spool 12. The tube must be carefully inserted so that the inner layers of cable 26 are not snagged and pulled down during the process. A payout guide 46 is then fastened to the outside face of second flange 16 of spool 12.

In practice the inner diameter 48 of payout guide 46 was kept to be approximately the same as the diameter of stabilizing tube 42. An elastomeric diaphragm 50 with a hole 52 through its center, roughly the same size as the outer diameter of stabilizing tube 42, is then fastened over payout guide 46.

The diameter of stabilizing tube 42 is such that a tubular shaped void 54 will exist between the stabilizing tube 42 and an inner diameter periphery 56 of the coil of cable 26. It is through this void that the inner loose end 58 of cable 26 is fed. Diaphragm 50 provides friction for payout back tension, preventing ballooning of cable 26 as it exits its pack formation.

Figure 9:
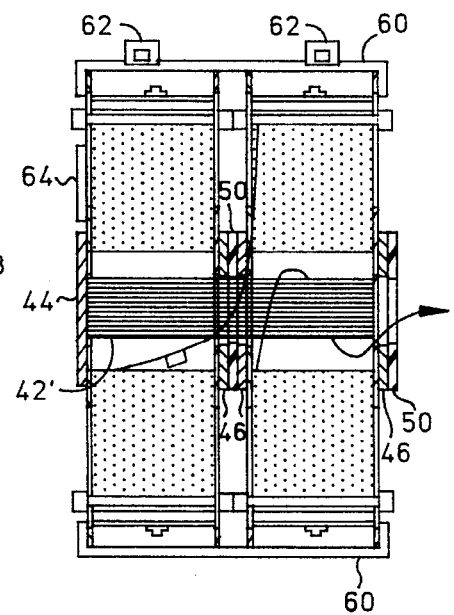
In FIG. 9 there is shown a plurality of fiber optic cable packs joined in unison so as to accommodate an extended cable length.

Referring now to FIG. 9, a cable pack could consist of more than one spool. Of course multiple spool packs will require more attention because of the cable interconnections required between spools. Besides the payout guide 46 and diaphragm 50 placed on one of the outside flanges of this double spool combination, two payout guides 46 are placed on the inside flanges of the spools with a single rubber diaphragm 50 being placed between the two guides. In this case an elongated payout stabilizing tube 42' would be designed to pass through both of the adjoined spools.

For a two-spool pack such as that shown, both spools are clamped together with spool clamps 60. Pad eyes 62 used in conjunction with clamps 60 serve as a lifting aid for the spools.

Those skilled in the art will readily see that a large plurality of spools may be interconnected if so desired. The multiple spools, as with the single spools, can be equipped with level gauge sensors 64 that tell an operator the orientation of the spools with respect to level ground. In addition, a strain relief mechanism (not shown) can be provided with the cable packs to prevent instrument damage in the event that the deployed cable is pulled beyond its strength limitations. The strain relief will permit the cable to fail before any interconnected electrical equipment is damaged.

As a dispensing cable nears its end, an operator should be warned to stop the cable payout. It is also desirable for the operator to have knowledge of the amount cable dispensed for planning purposes. An array of opto-electric diffused-type sensors may be used as proximity sensors to provide an indication of the amount of cable left in the system's spool or spools as well as to provide an operator with a low cable warning signal. Such a sensor may emit an infrared signal that is reflected from the surface of the cable and registered in a receiving element.

The fiber optic cable payout system of the invention is considered an improvement over previous methods of cable payout in at least the following areas: (1) compact size of the overall cable pack (approximately a 19 to 20 inch cable pack diameter with a 6.5 to 7 inch cable pack width for 4.8 to 4.9 km of cable); (2) rapid preparation time for the inside payout cable packs (rewinding at approximately 10 kilometers per hour); (3) rapid payout speeds (this system has been successfully deployed at payout speeds of approximately 45 miles per hour); (4) very low payout tensions (approximately one pound); (5) negligible optical attenuation incurred during pack preparation (less than 0.02 dB/km) and during payout (less than 3 dB); and (6) no net accumulation of axial cable twist during repeated cable payout operation.

The compact size and rapid preparation of the overall cable package is considered to be due to the following combination of techniques to wind and payout cable: non-precision (or random) winding, inside payout, the lack of cable adhesives, the lack of pack foaming, and a minimum number of parts required for pack preparation. Random winding of the cable requires very little skill and attention from the winding operator.

It was found that the inside payout technique is a very effective method of packaging cable into a compact volume. Besides the actual volume of the cable itself very little additional space is necessary. In addition the invention requires very low payout tensions and results in minimum levels of optical attenuation. This is generally attributed to the inside payout technique as well as the cable winding and pack preparation technique utilized in the invention. Once cable has been payed out, the utilized cable payout spool is easily reconfigured to a cable recovery spool. Basically, all this requires is removal of the stand-offs and reinstallation of the collapsible inner core.

The packaging method of using stand-offs and adhesive tape to support the cable pack is another factor considered responsible for the payout pack's stability, reliability and rapid preparation. The tape provides a cost effective way to apply the necessary adhesion to the last outside layers of the cable pack (to prevent them from collapsing). The typical two- to three-inch wide duct tape requires only about thirty seconds to apply after the cable has been wound. Reuse of this tape is not recommended.

Utilizing the stand-offs with the invention has been found to be advantageous in at least two regards. First, the stand-offs supports the cable pack between the flanges after the collapsible core has been removed. Mounted in slotted holes, the stand-offs are adjustable for different pack outer diameters. Second, the stand-offs retain the adhesive tape so that the tape is not pulled out as the last layers of cable are dispensed. The alternative to the stand-offs and tape is the use of glue and foam, which are timely and painstaking processes.

The efficiency of this invention in reliably deploying cable at rapid speeds without failures from tangles and collapsing packs is largely credited to the use of a stabilizing tube and diaphragm. As stated previously, the basic problem associated with inside payout techniques is that the cable tends to fall into the empty interior core due to the lack of core support. This results in cable tangles and is particularly troublesome when the last few layers of cable are dispensed.

By placing the stabilizing tube through the core of the pack any cable that does collapse will wrap around the tube, maintain its loop, and payout without difficulty. In one particular example a three-inch diameter tube was used with a cable pack having a six-inch diameter hollow core. The 1.5 inch radial void around the tube was ample for cable payout. Besides this stabilizing tube, it was found that if cable winding tensions were increased, the cable pack became tighter and neighboring cable layers supported each other to add further stability to the pack.

Obviously, many modifications and variations of the invention are possible in the light of the above teachings. It is therefore to be understood that within the scope of the appended claims, the invention may be practiced otherwise, than as has been specifically described.

What is claimed is:

1. An apparatus comprising:

a coil of cable defining a cylindrically shaped inner diameter periphery;

a cylinder coaxially disposed within said cylindrically shaped inner diameter periphery of said coil, said cylinder being of a diameter smaller than the diameter of said inner diameter periphery of said coil such that a tubular shaped void through which said cable may payout is defined between said cylinder and said inner diameter periphery of said coil;

a first flange disposed on one axial end of said coil and a second flange disposed on a second axial end of said coil, said cylinder being attached to said first flange with said second flange defining a circular aperture that is coaxially aligned with said inner diameter periphery of said coil of cable and through which said cable may pass;

a payout guide attached to said second flange to partially enclose one axial end of said tubular shaped void, said payout guide being axially offset from said cylinder so as to define a gap therebetween through which said cable may payout; and at least one attachment fixed between said first and second spool flanges adjacent an outer diameter periphery of said coil of cable.

2. An apparatus according to claim 1 in which said coil of cable has no adhesive applied between individual cable strands.

3. An apparatus according to claim 1 in which said cylinder is a tube.

4. An apparatus according to claim 1 further including an adhesive tape that is wrapped over said at least one attachment and a portion of said outer diameter periphery of said coil of cable so that said tape adheres to both said at least one attachment and said cable.

5. A method for assembling a cable pack comprising the steps of:

winding cable onto a removable core, two-flanged spool;

attaching stand-offs to said flanges of said spool, said stand-offs extending from a first flange of said spool to a second flange of said spool and being disposed to press against an outer diameter periphery of said cable wound upon said spool;

wrapping an adhesive tape over said stand-offs and a portion of said outer diameter periphery of said cable wound on said spool so that said tape adheres to both said stand-offs and said cable;

removing said core from said flanges of said spool to expose an inner diameter periphery of the cable wound on said spool and to define a circular aperture in said second flange that is coaxially aligned with said inner diameter periphery of the cable wound on said spool;

inserting a pay-out stabilizing tube between said inner diameter periphery of the cable wound on said spool, said pay-out stabilizing tube being attached to said first flange of said spool and being of a diameter such that a tubular shaped void exists between said pay-out stabilizing tube and said inner diameter periphery of said cable wound on said spool;

fastening a payout guide to said second flange to partially enclose one axial end of said tubular shaped void, said payout guide being axially offset from said pay-out stabilizing tube so as to define a cable guide gap therebetween through which said cable may payout; and feeding said cable through said cable guide gap.

6. A method according to claim 5 in which no adhesive is used in said step of winding of said cable.

7. A method according to claim 5 in which said winding is non-precision level wound at a winding pitch set within the range of 0.5" to 1.0" and at a winding tension of approximately 3 pounds.

8. A method according to claim 5 in which said removable core is a collapsible core.

9. A method according to claim 5 in which said cable is twisted during winding so that one axial cable twist is introduced into said cable for each wind of cable around said spool.

10. A method according to step 5 further including the step of installing a protective and reenforcing shroud over said tape.

11. A method according to step 5 further including the step of fastening a rubber diaphragm about the periphery of said cable guide opening so that said cable can rub upon said rubber diaphragm when travelling through said cable guide opening.

12. A method for assembling a fiber optic cable pack comprising the steps of:

winding fiber optic cable onto a collapsible core, two-flanged spool thereby forming a coil of cable, said winding being non-precision level wound at a winding pitch set within the range of 0.5" to 1.0" and at a winding tension of approximately 3 pounds, said cable being twisted so that one axial cable twist is introduced into said cable for each wind of cable around said spool;

attaching stand-offs to said flanges of said spool that extend from a first flange of said spool to a second flange of said spool and that are disposed to press against an outer diameter periphery of said cable wound upon said spool;

wrapping an adhesive tape over said stand-offs and a portion of said outer diameter periphery of said cable wound on said spool so that said tape adheres to both said stand-offs and said cable;

installing a protective and reenforcing shroud over said tape;

removing said collapsible core from said flanges of said spool to define a circular aperture in said second flange that is coaxially aligned with said inner diameter periphery of the fiber wound on said spool and to expose an inner diameter periphery of said coil of cable;

inserting a pay-out stabilizing tube between said inner diameter periphery of said coil of cable, said pay-out stabilizing tube being attached to said first flange of said spool and being of a diameter such that a tubular shaped void exists between said pay-out stabilizing tube and said inner diameter periphery of said coil of cable;

fastening a payout guide defining a cable guide opening to said second flange to partially enclose one axial end of said tubular shaped void, said payout guide being axially offset from said pay-out stabilizer tube so as to define a cable guide gap therebetween through which said cable may payout;

fastening a rubber diaphragm about the periphery of said cable guide opening so that said cable can rub upon said rubber diaphragm when travelling through said cable guide opening; and feeding said cable through said cable guide gap and through said cable guide opening.

13. A method according to claim 12 in which no adhesive is used in said step of winding of said cable.

* * * * *